Aug. 4, 1970    H. INDZEOSKI    3,522,965
LAWN CONDITIONING TOOL
Filed June 6, 1968
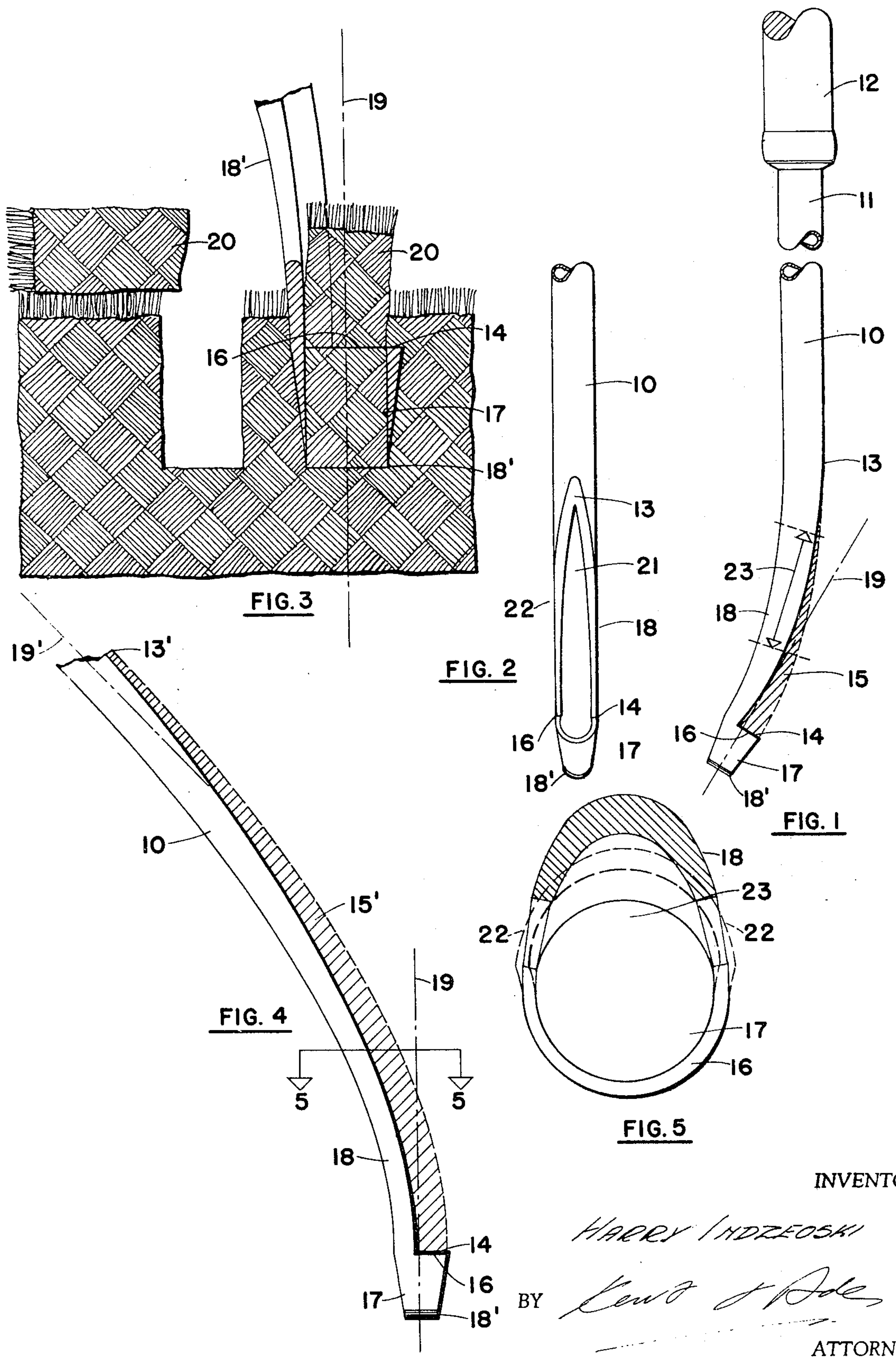
INVENTOR
HARRY INDZEOSKI
BY
ATTORNEY

United States Patent Office 3,522,965
Patented Aug. 4, 1970

3,522,965

LAWN CONDITIONING TOOL

Harry Indzeoski, 729 Scotland Ave., Winnipeg, Manitoba, Canada

Filed June 6, 1968, Ser. No. 734,997
Claims priority, application Great Britain, June 9, 1967, 26,669/67
Int. Cl. A01b *1/16*
U.S. Cl. 294—50.7 2 Claims

ABSTRACT OF THE DISCLOSURE

An edge sharpened ring on the lower end of a handle for aerating lawns including a portion of the wall of a tube being ground away to form the ring. The remaining wall above the ring is then curved so that the longitudinal axis of the ring diverges from the longitudinal axis of the tube so that earth plugs are ejected freely.

This invention relates to new and useful improvements in lawn conditioning tools, particularly tools which can be hand operated and are designed for aerating the lawn.

It is well known that lawns, particularly when grown on relatively heavy clay soils and the like, readily get compacted. It is also well known that a lawn grows more extensively if this compaction can be relieved by loosening the immediate sub-surface.

Commercial aeraters are known but these are not readily available for home lawns and the like.

My invention overcomes these disadvantages by enabling a home owner to aerate the lawn readily and easily.

This is accomplished by the provision of an edge sharpened ring tube which may be pushed downwardly into the surface of the lawn thus extruding a small plug of soil and forming an air pocket. The novel feature of the invention is the curved end of the shaft whereby the line of extension of the longitudinal axis of the cutting ring clears the shaft so that the plug of soil is extruded easily without any binding occurring.

Aerating the lawn with this device provides relatively small plugs of soil which, coming from around the roots are formed of relatively fine soil so that these plugs act as a top soil dressing. The pockets formed not only aerate the lawn but enable dead leaves and moisture to enter the pockets and act as fertilizer or, alternatively, any fertilizer or seeds spread upon the lawn may also enter these pockets and can be retained therein.

Fertilizer is trapped within the pockets thus providing fertilizer for the roots and the pockets give a cushioning effect to the lawn particularly where traffic is relatively heavy.

With the foregoing considerations in view, and such other objects, purposes or advantages as may become apparent from consideration of this disclosure and specification, the present invention consists of the inventive concept exhibited in the method, process, construction, arrangement of parts, or new use of any of the foregoing herein particularly exemplified in one or more specific embodiments of such concept, reference being had to the accompanying figures in which:

FIG. 1 is a side elevation of the device.

FIG. 2 is a view at right angles to FIG. 1.

FIG. 3 is a fragmentary, partially sectioned enlarged view of the cutting ring inserted in a lawn surface.

FIG. 4 is a side elevation of the preferred embodiment of my device.

FIG. 5 is a cross section of FIG. 4 along the line 5—5 thereof but enlarged with respect to FIG. 4.

In the drawings like characters of reference indicate corresponding parts in the different figures.

Proceeding therefore to describe the invention in detail, the device is formed from a length of tubular steel or the like 10 to the end 11 of which is attached a wooden handle or the like 12 for manipulating the device.

From a point 13 to a point 14 on one side of the length of tubular steel, an area 15 indicated by cross hatching is ground away or otherwise removed, this ground away portion increasing in depth from the point 13 to the maximum depth at the point 14 terminating in a right angle rear wall 16.

This leaves a relatively short tube or ring 17 upon the extremity of the tubular member 10 and this ring is edge sharpened as at 18.

The strip of steel 18 left after the portion 15 is ground away, is then curved downwardly as illustrated so that the longitudinal axis of the ring 17 indicated by reference character 19, clears the point 13 as clearly indicated in FIGS. 1 and 3.

In operation, the device is pressed downwardly into the lawn with the ring 17 being substantially vertical. The plug of soil 20 extrudes through the ring and clears the point 13 so that it is ejected cleanly upon the surface without any danger of binding or clogging occurring.

It is relatively simple to push this sharpened ring downwardly a relatively short distance into the surface of the lawn, as one is walking along, extruding the plugs of soil upon the surface.

Note should be taken of the groove 21 formed by the inner wall of the tube after the portion 15 has been removed.

This groove guides the plug 20 upwardly and away from the portion 10 of the tube. Furthermore, if the side walls 22 of the tube are spread apart slightly around the area 23 this helps considerably to eject the plug 20.

FIG. 4 shows the preferred embodiment of the device which is constructed in a similar manner with the exception that the ground away portion 15' extends clear around the curved wall 18 to point 13' being substantially adjacent the junction of the tubular portion with the handle 12.

I have found that this more readily provides complete ejection of the plugs 20 in use and prevents any binding occurring.

I have defined this curvature of the wall by stating that the longitudinal axis 19 of the tubular ring 17 diverges from the longitudinal axis 19' of the tubular portion.

Hereagain the side walls 22 are spread apart slightly as indicated in FIG. 5 thus assisting in the ejection of the plug 20.

Various modifications can be made within the scope of the inventive concept disclosed. Accordingly, it is intended that what is described herein should be regarded as illustrative of such concept and not for the purpose of limiting protection to any particular embodiment thereof, but that only such limitations should be placed upon the scope of protection to which the inventor hereof is entitled, as justice dictates.

What is claimed to be the present invention is:

1. A hand tool for aerating a lawn, comprising a tubular member having a lower ground-engaging end and an upper handle end, a portion of said tubular member above a point spaced upwardly from the lower end being open at one side thereof and the lower end portion of the member below said point constituting a ring for penetrating the ground and extruding a plug of earth therefrom, said open-sided portion of the member being longitudinally curved so that its open side is disposed at the outside of the curvature and so that a straight axial line through said ring is substantially tangential to the curvature and passes outwardly through the open side of the member, whereby to permit an earth plug extruded by said ring to be ejected outwardly in a substantially straight line through the open side of said member.

2. The device as defined in claim 1 together with a handle provided on the upper end of said tubular member.

References Cited

UNITED STATES PATENTS

| | | | |
|---|---|---|---|
| 913,350 | 2/1909 | Baylis | 294—50.7 |
| 2,194,597 | 3/1940 | Johnson | 294—50.7 |

ANDRES H. NIELSEN, Primary Examiner